(12) United States Patent
Hamada

(10) Patent No.: US 12,549,021 B2
(45) Date of Patent: Feb. 10, 2026

(54) BATTERY VOLTAGE EQUALIZATION DEVICE

(71) Applicant: FDK CORPORATION, Tokyo (JP)

(72) Inventor: Kenji Hamada, Tokyo (JP)

(73) Assignee: FDK CORPORATION, Tokyo (JP)

( * ) Notice: Subject to any disclaimer, the term of this patent is extended or adjusted under 35 U.S.C. 154(b) by 789 days.

(21) Appl. No.: 17/760,075

(22) PCT Filed: Jan. 27, 2021

(86) PCT No.: PCT/JP2021/002699
§ 371 (c)(1),
(2) Date: Aug. 3, 2022

(87) PCT Pub. No.: WO2021/192581
PCT Pub. Date: Sep. 30, 2021

(65) Prior Publication Data
US 2023/0083009 A1     Mar. 16, 2023

(30) Foreign Application Priority Data

Mar. 23, 2020   (JP) ................................. 2020-051201

(51) Int. Cl.
*H02J 7/00*      (2006.01)
*H01M 10/42*     (2006.01)
(Continued)

(52) U.S. Cl.
CPC ............ *H02J 7/0019* (2013.01); *H02H 7/18* (2013.01); *H02J 7/00304* (2020.01); *H02J 7/06* (2013.01); *H01M 2010/4271* (2013.01)

(58) Field of Classification Search
CPC ...... H02J 7/0016; H02J 7/0014; H02J 7/0018; H02J 7/0019; H02J 2207/20;
(Continued)

(56) References Cited

U.S. PATENT DOCUMENTS

2004/0100740 A1*  5/2004  Iwashita .............. H02H 7/1213
                                                    361/18
2005/0140335 A1*  6/2005  Lee ....................... H02J 7/0018
                                                    320/118
(Continued)

FOREIGN PATENT DOCUMENTS

DE    102021202885 A1 *  9/2022  ............ H02J 7/0047
EP       3553874 A1       10/2019
(Continued)

OTHER PUBLICATIONS

Extended European Search Report dated Apr. 10, 2024, for corresponding European Application No. 21776733.4.
(Continued)

*Primary Examiner* — Julian D Huffman
*Assistant Examiner* — Lisa Kotowski
(74) *Attorney, Agent, or Firm* — Kinney & Lange, P.A.

(57) ABSTRACT

A battery voltage equalization device 1 includes: a transformer T including a primary winding T1 into which the output voltage of a battery pack BP is inputted and a plurality of secondary windings T2 corresponding to each of batteries B; a conversion circuit 2 that converts an AC voltage outputted by the secondary windings T2 to a DC voltage; a cutoff circuit 3 provided to cut off a conductive pathway from the conversion circuit 2 to the batteries B; and a control unit 5 that controls the energization of the primary winding T1, wherein the cutoff circuit 3 includes a first switch SW1 and the second switch SW2 which are provided in series on the conductive pathway and which are opened or closed by the control unit, a first body diode Db1 and a second body diode Db2 of which the same terminals are connected to each other and which are respectively connected in parallel with the switches, and a surge suppression resistor Rss connected in parallel with the first body diode Db 1 or the second body diode Db2 for which the direction (Continued)

of charging current to the batteries B is the forward direction.

8 Claims, 2 Drawing Sheets

(51) Int. Cl.
*H02H 7/18* (2006.01)
*H02J 7/06* (2006.01)

(58) Field of Classification Search
CPC .............. B60L 11/1866; B60L 58/22; H01M 2010/4271; H01M 10/44; Y02E 60/10
See application file for complete search history.

(56) References Cited

U.S. PATENT DOCUMENTS

| | | | |
|---|---|---|---|
| 2011/0076525 A1 | 3/2011 | Zhang et al. | |
| 2011/0140663 A1* | 6/2011 | Tofigh | H02J 7/0019 320/116 |
| 2012/0293129 A1* | 11/2012 | Naghshtabrizi | H02J 7/0048 320/118 |
| 2014/0062383 A1 | 3/2014 | Yun et al. | |
| 2015/0295428 A1* | 10/2015 | Moussaoui | H02J 7/007184 320/116 |
| 2019/0199197 A1* | 6/2019 | Hamada | H02M 3/33573 |

FOREIGN PATENT DOCUMENTS

| | | | | |
|---|---|---|---|---|
| JP | H11176483 A | | 7/1999 | |
| JP | 2002142371 A | | 5/2002 | |
| JP | 2003333762 A | | 11/2003 | |
| JP | 2005017156 A | | 1/2005 | |
| JP | 2010051082 A | * | 3/2010 | ............ H01M 10/48 |
| JP | 2011101572 A | | 5/2011 | |
| JP | 2013530665 A | | 7/2013 | |
| JP | 2013162661 A | * | 8/2013 | |
| JP | 2013223320 A | | 10/2013 | |
| JP | 2016178781 A | | 10/2016 | |

OTHER PUBLICATIONS

International Search Report and Written Opinion dated Apr. 13, 2021, for corresponding PCT Application No. PCT/JP2021/002699.

* cited by examiner

BATTERY VOLTAGE EQUALIZATION DEVICE

CROSS-REFERENCE TO RELATED APPLICATION(S)

This application is the national phase of PCT Application No. PCT/JP2021/002699 filed on Jan. 27, 2021, which claims priority to Japanese Application No. 2020-051201 filed on Mar. 23, 2020, the contents of which are incorporated herein by reference in their entirety.

BACKGROUND

Technical Field

The present disclosure relates to a battery voltage equalization device.

Background Art

In a battery pack formed from a plurality of battery cells connected in series, it is known that if the battery voltages of the respective battery cells become uneven, problems such as a limitation on the amount of electric energy that can be charged or discharged occur. For this reason, in such a battery pack, battery voltage equalization is often performed by a transformer-type active cell balancing circuit as disclosed in Patent Document 1, for example.

More specifically, a transformer-type active cell balancing circuit controls the electrical continuity of a transformer that can convert the output voltage of the battery pack to apply a charging voltage to each of the battery cells, and thereby charges battery cells with a relatively low battery voltage to equalize the battery voltages.

However, with the technology of the related art according to Patent Document 1, a return current that flows continuously through a plurality of secondary windings in the transformer, bypassing each of the battery cells, is produced, and the efficiency of the cell balancing control is reduced. Accordingly, for example, the cell balancing circuit disclosed in Patent Document 2 is configured to block the return current by being provided with a switch between each of the battery cells and the corresponding secondary winding.

PRIOR ART DOCUMENT

Patent Document

Patent Document 1: Japanese Patent Laid-Open No. 11-176483
Patent Document 2: Japanese Patent Laid-Open No. 2013-223320

SUMMARY

Incidentally, since the cell balancing circuits according to Patent Documents 1 and 2 above create charging power to be outputted to battery cells, a conversion circuit that converts the AC power outputted from the plurality of secondary windings in the transformer to DC power via a diode and a capacitor is provided. Note that in Patent Document 2, the capacitor is omitted from illustration in the drawings.

However, connecting a cell balancing circuit of the related art described above to a battery pack produces a surge current in which an excessive current suddenly flows into the capacitor from the battery cells. At this time, even if switches in the open state have been provided between the battery cells and the secondary windings as in Patent Document 2, the surge current still occurs at the timing when the switches are closed for the first time. Consequently, in the cell balancing circuits of the related art, the battery cells may be degraded in association with the production of the surge current due to the connection with the battery pack.

The present disclosure has been devised in the light of such circumstances, and an object thereof is to provide a battery voltage equalization device that suppresses a surge current when a battery pack is connected to a transformer-type active cell balancing circuit.

In order to achieve the above object, an aspect of the present disclosure is directed to a battery voltage equalization device that includes: a transformer including a primary winding into which an output voltage of a battery pack formed from a plurality of batteries connected in series is inputted and a plurality of secondary windings corresponding to each of the batteries; a conversion circuit that converts an AC voltage outputted by the secondary windings to a DC voltage; a cutoff circuit provided to cut off a conductive pathway from the conversion circuit to the batteries; and a control unit that equalizes respective battery voltages of the batteries by controlling the energization of the primary winding on a basis of the battery voltages, wherein the cutoff circuit includes two switches which are provided in series on the conductive pathway and which are opened or closed by the control unit, two diodes of which the same terminals are connected to each other and which are respectively connected in parallel with the switches, and a resistor connected in parallel with the diode for which a direction of charging current to the batteries is a forward direction from among the two diodes.

According to the present disclosure, it is possible to provide a battery voltage equalization device that suppresses a surge current when a battery pack is connected to a transformer-type active cell balancing circuit.

DETAILED DESCRIPTION

Hereinafter, an embodiment of the present disclosure will be described in detail and with reference to the diagrams. Note that the present disclosure is not limited to the content described hereinafter, and modifications may be carried out freely in a scope that does not change the gist of the present disclosure. Also, the drawings used in the description of the embodiment are all schematic illustrations of component members that have been partially emphasized, enlarged, reduced, omitted, or the like to deepen understanding, and are not accurate representations of the scale, shape, and the like of the component members.

Figure 1:
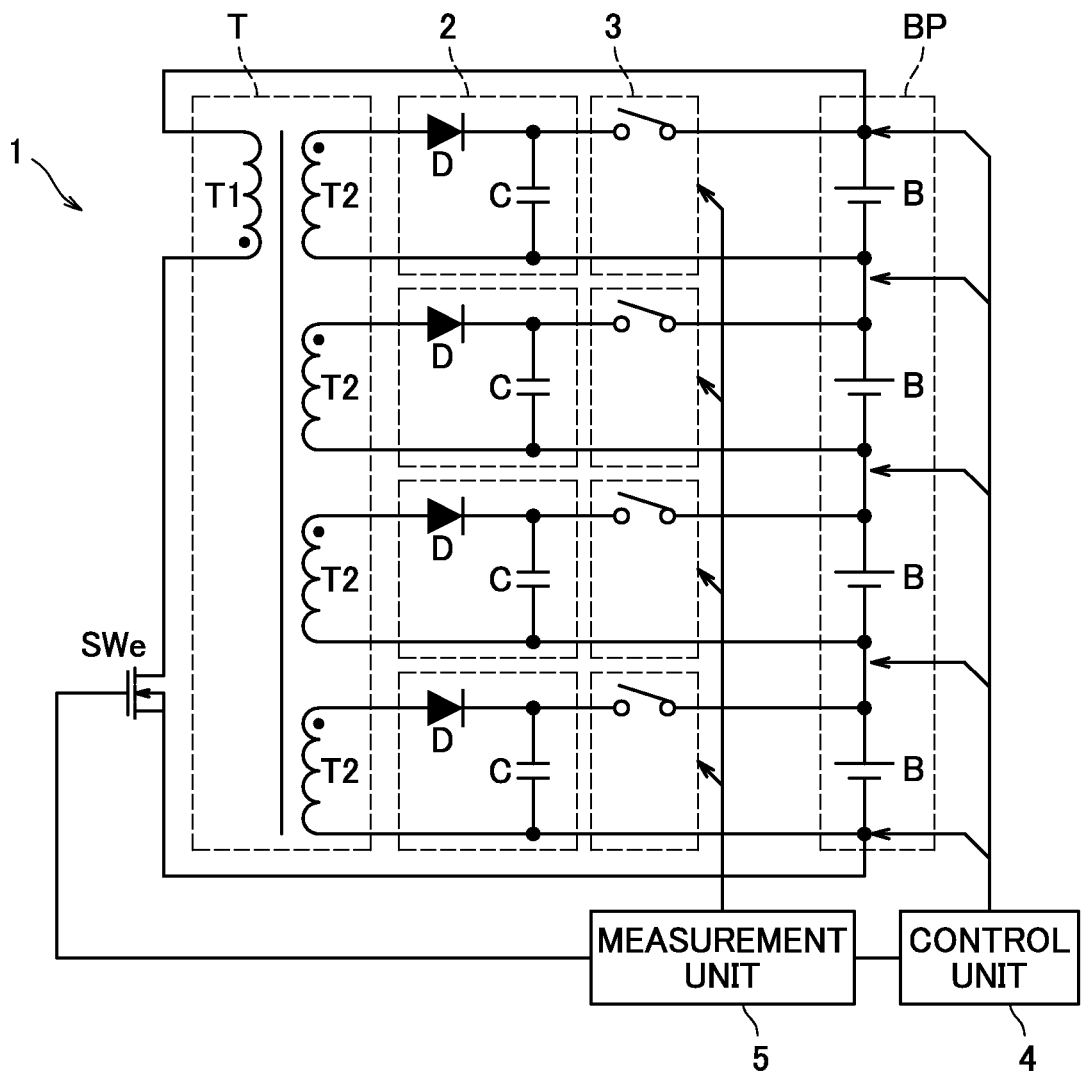
FIG. 1 is an overall configuration diagram illustrating a circuit of a battery voltage equalization device.

FIG. 1 is an overall configuration diagram illustrating a circuit of a battery voltage equalization device 1. The battery voltage equalization device 1 is a transformer-type active cell balancing circuit that is connected to a battery pack BP formed from a plurality of batteries B connected in series, and thereby equalizes the respective battery voltages of the batteries B. Here, each of the batteries B may be a secondary battery formed from a single battery cell or a secondary battery that is itself a battery pack in which a plurality of battery cells are connected in series. Also, although the battery pack BP is described as one in which four batteries B are connected in the present embodiment, the number of connected batteries B can be changed freely.

As an overall configuration, the battery voltage equalization device 1 is provided with a transformer T, an equalization switch SWe, a plurality of conversion circuits 2, a plurality of cutoff circuits 3, a measurement unit 4, and a control unit 5.

The transformer T includes a primary winding T1 into which the output voltage of the battery pack BP is inputted and a plurality of secondary windings T2 corresponding to each of the batteries B. The energization of the transformer T is controlled via the equalization switch SWe provided between the transformer T and the battery pack BP, whereby the output voltage of the battery pack BP is converted into AC power and inputted into the primary winding T1. Also, the transformer T converts the voltage inputted into the primary winding T1 to charging voltages for charging each of the batteries B, and outputs the charging voltages to the secondary windings T2.

In the present embodiment, the equalization switch SWe is an N-channel metal-oxide-semiconductor field-effect transistor (MOSFET), of which the drain is connected to end of the primary winding T1, the source is connected to the minus side of the battery pack BP, and the gate is connected to the control unit 5 described later. Additionally, the equalization switch SWe is controlled on/off continuously by the control unit 5, whereby the energization of the transformer T can be controlled as above.

Each secondary winding T2 of the transformer T is connected to a corresponding battery B through the conversion circuit 2 and the cutoff circuit 3. Since each charging pathway from a single secondary winding T2 to a single battery B in the battery voltage equalization device 1 has a common configuration, a single charging pathway from among the plurality is described here.

The conversion circuit 2 is a rectifier-smoothing circuit including a diode D and a capacitor C, and converts an AC voltage outputted by the secondary winding T2 to a DC voltage to create a charging voltage for charging an individual battery B.

As described in detail later, the cutoff circuit 3 is capable of cutting off the conductive pathway from the conversion circuit 2 to the battery B, and is configured to select the battery B to be charged in the cell balancing control.

The measurement unit 4 is a sensor that measures the respective battery voltages of the plurality of batteries B, and outputs the battery voltages to the control unit 5.

The control unit 5 is formed from a known microcontroller circuit, for example, and specifies the battery B to be charged on the basis of the battery voltages of the plurality of batteries B acquired through the measurement unit 4, puts the cutoff circuit 3 corresponding to the battery B to be charged in a connected state while putting the cutoff circuits 3 corresponding to the other batteries B in a cutoff state, and switches the equalization switch SWe on/off to preferentially charge the battery B to be charged.

Here, the control unit 5 may also determine how the battery voltages vary from one another and specify one or multiple batteries B to be charged. For example, the control unit 5 can calculate the average voltage of all the batteries B and specify a battery B with a battery voltage lower than the average voltage as the battery B to be charged. In this case, the control unit 5 controls cutoff by the cutoff circuit 3 corresponding to a battery B with a battery voltage higher than the average voltage, and performs a PWM control on the equalization switch SWe. With this arrangement, the battery B to be charged is charged and the battery voltages are equalized in the battery pack BP.

Additionally, on the condition that the voltage difference between the lowest-voltage battery with the lowest battery voltage out of all the batteries B and the average voltage is greater than a prescribed first threshold value TH1, the control unit 5 may control cutoff by the cutoff circuits 3 corresponding to the batteries B except for the lowest-voltage battery. Here, the first threshold value TH1 is a threshold value for the voltage difference freely set in advance for determining whether one battery B with a low battery voltage that stands out from among all of the batteries B exists. Consequently, if there is a battery B with an extremely low battery voltage, the control unit 5 can specify the one battery B as the battery to be charged and charge the battery B preferentially.

Furthermore, on the condition that the voltage difference between the highest-voltage battery with the highest battery voltage out of all the batteries B and the average voltage is greater than a prescribed second threshold value TH2, the control unit 5 may control cutoff by only the cutoff circuit 3 corresponding to the highest-voltage battery. Here, the second threshold value TH2 is a threshold value for the voltage difference freely set in advance for determining whether one battery B with a high battery voltage that stands out from among all of the batteries B exists. Consequently, if there is a battery B with an extremely high battery voltage, the control unit 5 can specify all batteries B other than the highest-voltage battery as the batteries to be charged and equalize the battery voltages while charging the battery pack BP evenly overall.

In this way, by controlling cutoff by the cutoff circuits 3 corresponding to the batteries B other than the battery B to be charged, the control unit 5 can select the battery B to be charged as necessary while also suppressing the return current that flows continuously through the plurality of secondary windings T2, bypassing each of the batteries B.

Figure 2:
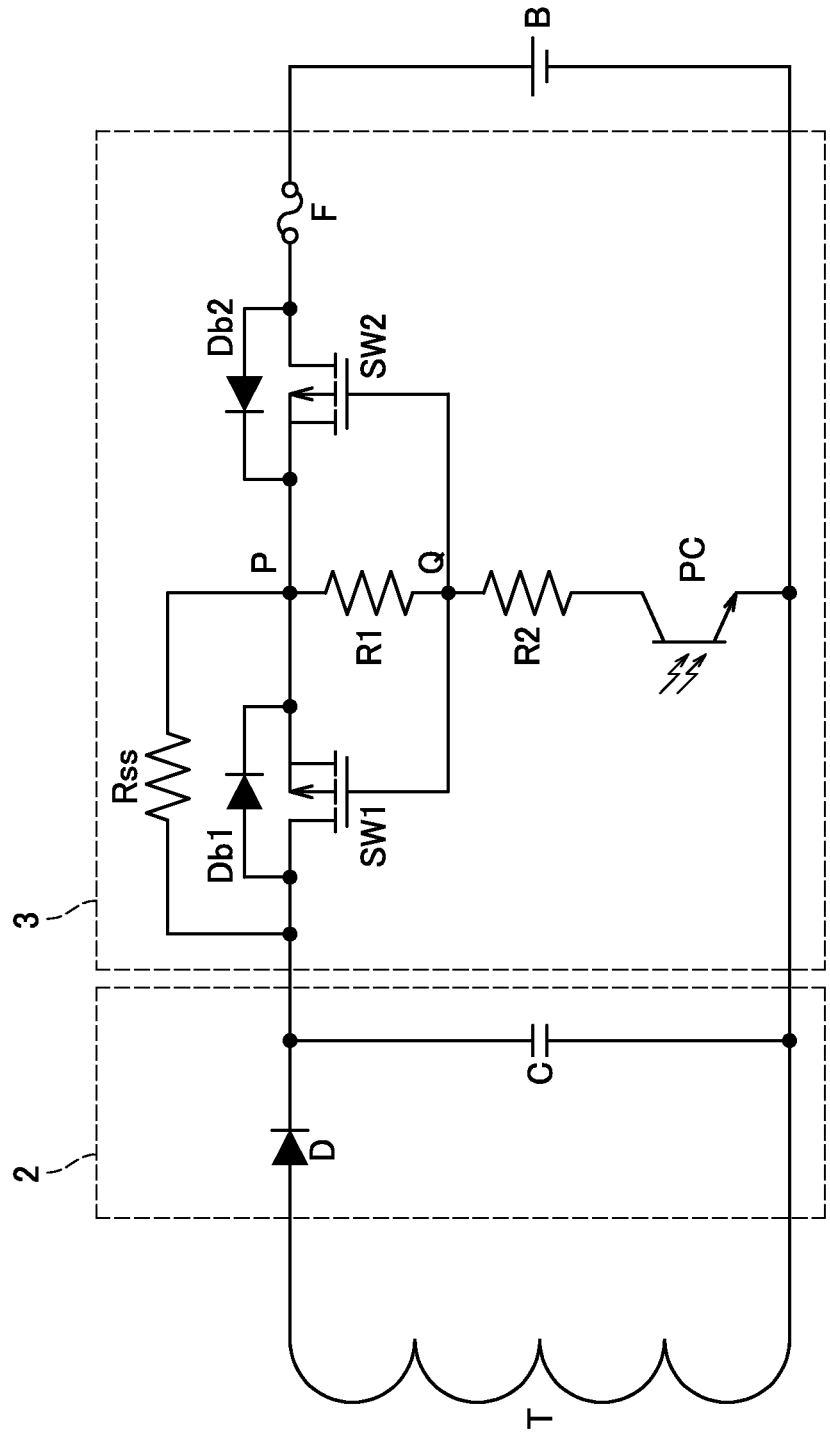
FIG. 2 is a circuit diagram illustrating a configuration of a cutoff circuit.

Next, a specific circuit configuration of the cutoff circuit 3 will be described. FIG. 2 is a circuit diagram illustrating a configuration of the cutoff circuit 3. In the cutoff circuit 3 of the present embodiment, a first switch SW1 and a second switch SW2 are connected in series as "two switches" between the output end on the high-voltage side of the conversion circuit 2 and the positive electrode of the battery B. The first switch SW1 and the second switch SW2 are P-channel MOSFETs, of which the sources of both are connected to each other at a connection point P and the gates of both are connected to each other as a "control input terminal" at a connection point Q.

Also, in the cutoff circuit 3 of the present embodiment, a first body diode Db1 and a second body diode Db2 are connected in parallel with the first switch SW1 and the second switch SW2, respectively. More specifically, the anode and cathode of the first body diode Db1 are respectively connected to the drain and source of the first switch SW1. Similarly, the anode and cathode of the second body diode Db2 are respectively connected to the drain and source of the second switch SW2. In other words, the same terminals, in this case the cathodes, of the first body diode Db1 and the second body diode Db2 are connected to each other.

Here, the first body diode Db1 and the second body diode Db2 that act as "two diodes" may be provided as diode elements separate from the first switch SW1 and the second switch SW2, but can contribute to a reduction in the number of parts by being the body diode of each MOSFET.

In addition, the cutoff circuit 3 includes a fuse F connected in series with the first switch SW1 and the second switch SW2. In the present embodiment, the fuse F is provided between the second switch SW2 and the battery B and functions as an "overcurrent protection element" so that an unintentional overcurrent does not flow from the secondary winding T2 to the battery B, for example, protecting the battery B from the overcurrent. Note that the fuse F is not an essential component of the battery voltage equalization device 1.

Furthermore, in the cutoff circuit 3, a first resistor R1 is provided between the connection point P and the connection point Q, and the light-receiving element of a photocoupler PC is provided via a second resistor R2 between the connection point Q and the negative electrode of the battery B. Note that the first resistor R1 and the second resistor R2 are current-limiting resistors. In the photocoupler PC, a light-emitting element not illustrated is connected to the control unit 5 and thereby controlled on/off according to a control signal from the control unit 5. With this arrangement, the control unit 5 can control the potential at the connection point Q while attaining isolation due to the photocoupler PC, and can control the opening and closing of the first switch SW1 and the second switch SW2 at the same time.

Here, the control unit 5 may be configured to transmit a control signal directly to the gate of each of the first switch SW1 and the second switch SW2, but by configuring the control unit 5 to collectively control both as in the present embodiment, the signal output terminals and signal lines for the control signal can be reduced, and moreover, a mechanism for synchronizing the control timings of the two switches is unnecessary.

Additionally, the cutoff circuit 3 includes a surge suppression resistor Rss that acts as a "resistor" connected in parallel with the diode for which the direction of charging current to the battery B is the forward direction from among the first body diode Db 1 and the second body diode Db2. In other words, in the present embodiment, the surge suppression resistor Rss is connected in parallel with the first body diode Db 1. Here, supposing that the first body diode Db 1 and the second body diode Db2 are provided such that the anodes are connected to each other, the surge suppression resistor Rss would be connected in parallel with the second body diode Db2.

Next, the operating principle of the cutoff circuit 3 will be described. First, in the technology of the related art not provided with switches between the secondary windings T2 and the batteries B, at the timing when the battery pack BP is connected to the cell balancing circuit, a surge current flows into the capacitor C of the conversion circuit 2 from the positive electrode of each battery B, and the batteries B may be degraded. Also, even in the technology of the related art provided with switches between the secondary windings T2 and the batteries B, after the battery pack BP is connected, a surge current occurs at the timing when the switches are closed for the first time, and the batteries B likewise may be degraded.

In contrast, in the battery voltage equalization device 1 provided with the cutoff circuit 3 having the configuration illustrated in FIG. 2, when the battery pack BP is connected, a current outputted from the positive electrode of each battery B flows to the capacitor C via the second body diode Db2, the connection point P, and the surge suppression resistor Rss in the above order. For this reason, since the current flowing from the battery B to the capacitor C is reduced by the surge suppression resistor Rss, degradation of the battery B can be inhibited. Also, in the battery voltage equalization device 1, even if an overcurrent protection element like the fuse F is provided, by suppressing the above surge current, the possibility that the surge current will become an overcurrent and cause incorrect operation can be lowered.

Furthermore, in the battery voltage equalization device 1, when a battery B to be charged is charged as part of the equalization control for the battery pack BP, the cutoff circuit 3 corresponding to that battery B is put into a connected state. At this time, the charging current outputted from the secondary winding T2 through the conversion circuit 2 is supplied to the battery B via the first switch SW1 and the second switch SW2 put into the closed state at the same time, and therefore the battery B can be charged without being influenced by the surge suppression resistor Rss.

As above, the transformer-type active cell balancing circuit of the battery voltage equalization device 1 is configured to charge only the battery B to be charged by using the cutoff circuit 3 to connect or disconnect the conductive pathway from the transformer T to each battery B. Moreover, in the battery voltage equalization device 1, the surge suppression resistor Rss is provided on the path of the current that flows from the battery B to the capacitor C when the battery pack BP is connected, and therefore the magnitude of the current can be reduced. Consequently, according to the battery voltage equalization device 1 can suppress a surge current when the battery pack BP is connected.

This concludes the description of the embodiment, but the battery voltage equalization device 1 is not limited to the foregoing embodiment. For instance, although the above illustrates the example of a configuration in which the first switch SW1 and the second switch SW2 in the cutoff circuit 3 are provided between the output end on the high-voltage side of the conversion circuit 2 and the positive electrode of the battery B, the switches may also be provided between the output end on the low-voltage side of the conversion circuit 2 and the negative electrode of the battery B.

<Aspects of present disclosure>

A first aspect of the present disclosure is a battery voltage equalization device that includes: a transformer including a primary winding into which an output voltage of a battery pack formed from a plurality of batteries connected in series is inputted and a plurality of secondary windings corresponding to each of the batteries; a conversion circuit that converts an AC voltage outputted by the secondary windings to a DC voltage; a cutoff circuit provided to cut off a conductive pathway from the conversion circuit to the batteries; and a control unit that equalizes respective battery voltages of the batteries by controlling the energization of the primary winding on a basis of the battery voltages, wherein the cutoff circuit includes two switches which are provided in series on the conductive pathway and which are opened or closed by the control unit, two diodes of which the same terminals are connected to each other and which are respectively connected in parallel with the switches, and a resistor connected in parallel with the diode for which a direction of charging current to the batteries is a forward direction from among the two diodes.

A second aspect of the present disclosure is a battery voltage equalization device in which, in the first aspect of the present disclosure described above, the switches are MOSFETs in which the diodes are body diodes.

A third aspect of the present disclosure is a battery voltage equalization device in which, in the first or second aspect of the present disclosure described above, control input terminals of the two switches are connected to each other.

A fourth aspect of the present disclosure is a battery voltage equalization device in which, in any of the first to third aspects of the present disclosure described above, the cutoff circuit includes a photocoupler connected to the two switches and is controlled by the control unit through the photocoupler.

A fifth aspect of the present disclosure is a battery voltage equalization device in which, in any of the first to fourth aspects of the present disclosure described above, the control unit controls cutoff by the cutoff circuit corresponding to the battery with a battery voltage higher than an average voltage.

A sixth aspect of the present disclosure is a battery voltage equalization device in which, in any of the first to fourth aspects of the present disclosure described above, the control unit, on a condition that a voltage difference between a lowest-voltage battery with the lowest battery voltage and an average voltage is greater than a prescribed first threshold value, controls cutoff by the cutoff circuit corresponding to the batteries except for the lowest-voltage battery.

A seventh aspect of the present disclosure is a battery voltage equalization device in which, in any of the first to fourth aspects of the present disclosure described above, the control unit, on a condition that a voltage difference between a highest-voltage battery with the highest battery voltage and an average voltage is greater than a prescribed second threshold value, controls cutoff by only the cutoff circuit corresponding to the highest-voltage battery.

An eighth aspect of the present disclosure is a battery voltage equalization device in which, in any of the first to seventh aspects of the present disclosure described above, the cutoff circuit includes an overcurrent protection element connected in series with the two switches.

EXPLANATION OF REFERENCE SIGNS 1 battery voltage equalization device
2 conversion circuit
3 cutoff circuit
4 measurement unit
5 control unit
T transformer
B battery
BP battery pack
SW1 first switch
Db1 first body diode
SW2 second switch
Db2 second body diode
Rss surge suppression resistor

The invention claimed is:

1. A battery voltage equalization device comprising:
a transformer including a primary winding into which an output voltage of a battery pack formed from a plurality of batteries connected in series is inputted and a plurality of secondary windings corresponding to each of the batteries;
a conversion circuit that converts an AC voltage outputted by the secondary windings to a DC voltage;
a cutoff circuit provided to cut off a conductive pathway from the conversion circuit to the batteries; and
a control unit that equalizes respective battery voltages of the batteries by controlling an energization of the primary winding on a basis of the battery voltages,
wherein the cutoff circuit includes:
two switches which are provided in series on the conductive pathway and which are opened or closed by the control unit,
two diodes having two same terminals that are connected to each other, the two diodes being respectively connected in parallel with the switches, and
a resistor connected in parallel with one of the two diodes for which a direction of charging current to the batteries is a forward direction from among the two diodes.

2. The battery voltage equalization device according to claim 1, wherein the switches are MOSFETs in which the two diodes are respective body diodes.

3. The battery voltage equalization device according to claim 1, wherein control input terminals of the two switches are connected to each other.

4. The battery voltage equalization device according to claim 1, wherein
the cutoff circuit includes a photocoupler connected to the two switches and is controlled by the control unit through the photocoupler.

5. The battery voltage equalization device according to claim 1, wherein
the control unit controls cutoff by the cutoff circuit corresponding to one of the batteries having a battery voltage higher than an average voltage.

6. The battery voltage equalization device according to claim 1, wherein
the control unit, in response to a voltage difference between a lowest-voltage battery with the lowest battery voltage and an average voltage being greater than a prescribed first threshold value, controls cutoff by the cutoff circuit corresponding to the batteries except for the lowest-voltage battery.

7. The battery voltage equalization device according to claim 1, wherein
the control unit, in response to a voltage difference between a highest-voltage battery with the highest battery voltage and an average voltage being greater than a prescribed second threshold value, controls cutoff by only the cutoff circuit corresponding to the highest-voltage battery.

8. The battery voltage equalization device according to claim 1, wherein
the cutoff circuit includes an overcurrent protection element connected in series with the two switches.

* * * * *